3,712,904
7-TRIAZOLYL-COUMARINS
Klaus-Dieter Bode, Leverkusen, and Carl-Wolfgang Schellhammer, Opladen, Germany, assignors to Farbenfabriken Bayer Aktiengesellschaft, Leverkusen, Germany
No Drawing. Filed June 18, 1969, Ser. No. 834,504
Claims priority, application Germany, June 26, 1968,
P 17 70 711.8
Int. Cl. C07d 99/04; C09k 1/02
U.S. Cl. 260—308 R       2 Claims

ABSTRACT OF THE DISCLOSURE

This invention relates to 7-triazolyl-coumarins of the formula

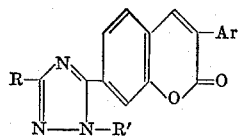

in which Ar and R denote an optionally substituted aromatic or heteroaromatic radical and R' denotes hydrogen or an optionally substituted alkyl radical, and the coumarin ring may contain further substituents. These materials are used as optical brightening agents.

---

The subject-matter of the present invention comprises 7-triazolyl-coumarins of the general formula

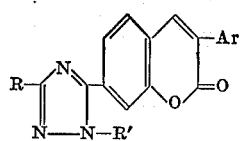

in which Ar and R denote an optionally substituted aromatic or heteroaromatic radical and R' denotes hydrogen or an optionally substituted alkyl radical, and the coumarin ring may contain further substituents, as well as their preparation and their use as optical brightening agents.

Suitable aromatic radicals R are primarily phenyl radicals or naphthalene radicals which may carry substituents, such as alkyl groups with 1-4 carbon atoms, for example, methyl, ethyl, isopropyl, n-propyl, n-butyl, isobutyl or tert.-butyl groups; alkoxy groups with 1-4 carbon atoms, such as methoxy, ethoxy or butoxy groups; halogen atoms, such as fluorine, chlorine or bromine; and cycloalkyl groups, such as cyclohexyl groups.

Suitable heteroaromatic radicals Ar are primarily 5- or 6-membered radicals which contain nitrogen or sulphur and may contain further substituents, such as pyrazolyl, imidazolyl, 1,2,4-triazolyl, 1,2,3-triazolyl, thienyl or pyridyl radicals; in the case of nitrogen-containing heterocycles, the linkage to the coumarin ring may take place via carbon or nitrogen.

Suitable radicals R are primarily phenyl radicals or naphthalene radicals which may contain substituents, such as alkyl groups with 1-4 carbon atoms, for example, methyl, ethyl, propyl or tert.-butyl groups; alkoxy groups with 1-4 carbon atoms, such as methoxy, ethoxy or butoxy groups; halogen atoms, such as fluorine, chlorine or bromine; cycloalkyl groups, such as cyclohexyl groups; and aromatic groups, such as phenyl, p-chlorophenyl, o-chlorophenyl or p-methyl-phenyl groups.

Suitable radicals R' are primarily hydrogen and alkyl radicals with 1-4 carbon atoms, such as methyl, ethyl or butyl radicals.

The preferred compounds are those of the general formula

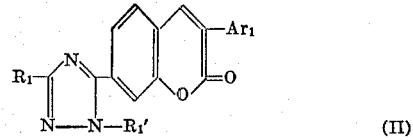

in which $R_1$ stands for a phenyl or naphthyl radical which may be substituted by halogen, alkyl, alkoxy, phenyl or cycloalkyl groups; $R_1'$ denotes hydrogen or an alkyl group with 1-4 carbon atoms; and $Ar_1$ stands for a phenyl radical which may be substituted by alkyl or alkoxy groups or for a pyrazolyl, imidazolyl, triazolyl, thienyl or pyridyl radical.

The 7-triazolyl-3-aryl-coumarins of the Formula I can be prepared by reacting suitable 3-aryl-coumarin-7-carboxylic acid halides of the general Formula III in which Ar has the same meaning as above and X stands for halogen, especially chlorine, with amidrazone hydrohalides of the general Formula IV in which X stands for halogen, especially chlorine, and in which R and R' have the same meaning as above, in suitable inert solvents and in the presence of at least molar amounts of basic compounds as acid acceptors, according to the following reaction scheme:

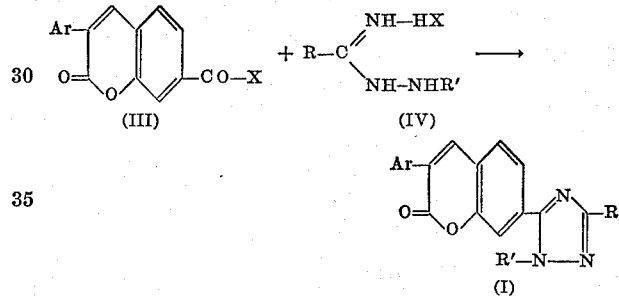

Suitable inert solvents are, for example, benzene, toluene, xylene, chlorobenzene, dichlorobenzene, trichlorobenzene, nitrobenzene, chloroform, carbon tetrachloride, nitromethane, dioxan, tetrahydrofuran or dimethyl sulphoxide.

Suitable basic compounds are primarily sodium carbonate, sodium hydroxide, potassium carbonate, potassium hydroxide, sodium hydrogen carbonate, collidine, triethylamine, and pyridine; the last-mentioned compound is also a suitable solvent.

In detail, the reaction is carried out by dissolving 1 mol of acid halide (III) in the inert anhydrous medium and reacting it in the presence of at least 1 mol of an acid acceptor with at least 1 mol of the amidrazone (IV) at temperatures between 40 and 180° C. for 1 to 10 hours. After cooling, the reaction product is filtered off with suction and recrystallised from solvents such as dimethyl sulphoxide, dimethyl formamide, methyl glycol, glycol monomethyl ether acetate, chlorobenzene, butanol or dioxan with the aid of active charcoal or tonsil.

The 3-aryl-coumarin-7-carboxylic acid chlorides serving as preferred starting materials are prepared by the reaction of thionyl chloide, phosphorus trichloride or phosphorus pentachloride with suitable 3-aryl-coumarin-7-carboxylic acids in the presence of dimethyl formamide or pyridine. The 3-aryl-coumarin - 7 - amino-carboxylic acids, in turn, are prepared by acidic hydrolysis, by means of sulphuric acid, phosphoric acid, acetic acid/hydrochloric acid or polyphosphoric acid and at an elevated temperatures, of the 3-aryl-7-cyano-coumarins which can be obtained from 3-aryl-7-amino-coumarins by diazotisation and reaction with heavy metal cyanides. Suitable 7-amino-3-aryl- or -3-heteroaryl-coumarins are described, for example, in Belgian patent specifications Nos. 660,-602 and 681,962.

Suitable amidrazones (IV) are, for example, the representatives set out in the following table and corresponding to the general formula:

$$R-C\begin{matrix}NH-HCl\\\\NH-NH-R'\end{matrix}$$

| R | R' |
|---|---|
| Phenyl | H |
| Phenyl | CH₃ |
| Cl-phenyl | H |
| Cl-phenyl | CH₃ |
| CH₃-phenyl | H |
| CH₃-phenyl | CH₃ |
| Pyridyl | H |
| CH₃O-phenyl | CH₃ |
| CH₃O-phenyl | H |
| C₄H₉-phenyl | CH₃ |
| Br-phenyl | CH₃ |
| Biphenyl | CH₃ |
| Naphthyl | CH₃ |
| Biphenyl | H |
| Biphenyl | CH₃ |

Suitable 3-aryl-coumarin-7-carboxylic acids are, for example, 3-phenyl-, p-tolyl-, p-anisyl-, p-chlorophenyl-, p-ethylphenyl-, p-ethoxyphenyl-, p-bromophenyl- or 3-pyrazolyl-(1)-coumarin-7-carboxylic acid.

The amidrazones used as starting materials are prepared in known manner by the reaction of suitable imino esters with hydrazines such as hydrazine or methyl-hydrazine.

The new compounds (I) are valuable optical brightening agents. They can be added, for example, to spinning or casting solutions of polyesters, polyamide, cellulose acetate, polypropylene, polyethylene or polyvinyl chloride serving for the production of synthetic filaments, fibres, foils or other articles. Moreover, the new compounds of the general Formula I are suitable for the optical brightening of polyester materials according to the thermosol process and for the optical brightening of filaments of polyester and polyvinyl chloride according to the HT-process, as well as for the brightening of varnishes based on cellulose acetate and nitrocellulose acetate. The brightening agents are used in amounts of about 0.05 to 1 percent by weight.

The degrees given in the examples are degrees centigrade.

EXAMPLE 1

(1) Preparation of 3-phenyl-7-[5-phenyl-2-methyl-1,2,4-triazolyl-(3)]-coumarin 44 g. N-methyl-benzamidrazone hydrochloride are suspended in 500 ml. of anhydrous toluene and, after the addition of 71 g. 3-phenyl-coumarin-7-carboxylic acid chloride and 10 ml. pyridine, stirred under reflux for 2 hours. After cooling, the pale yellow reaction product is filtered off with suction and recrystallised from dimethyl formamide with active charcoal. Yield 68 g., melting point 222–223°.

The compounds assembled in Table 2 are prepared from the corresponding starting compounds in an analogous manner.

TABLE 2

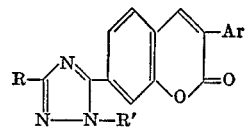

| Ar | R | R' | M.P., degree |
|---|---|---|---|
| Phenyl | 2-pyridyl | H | 265 |
| Do | p-Chlorophenyl | CH₃ | 265 |
| p-Tolyl | Phenyl | CH₃ | 250 |
| Do | do | H | 303 |
| p-Anisyl | do | CH₃ | 221 |
| Do | p-Chlorophenyl | CH₃ | 243 |
| Pyrazolyl | do | CH₃ | 266 |
| Do | Phenyl | CH₃ | 210 |

The 3-phenyl-coumarin-7-carboxylic acid chloride serving as starting material is prepared by heating 3-phenyl-coumarin-7-carboxylic acid with thionyl chloride under reflux in the presence of a few drops of dimethyl formamide. The 3-p-tolyl- and 3-p-methoxy-phenyl-coumarin-7-carboxylic acid chlorides can be prepared in the same way.

The 3-pyrazolyl-(1)-coumarin-7-carboxylic acid chloride is prepared by heating 3-pyrazolyl-(1)-coumarin-7-carboxylic acid with thionyl chloride under reflux in the presence of a few drops of dimethyl formamide; M.P. 203–205°. The 3 - pyrazolyl - (1)-coumarin-7-carboxylic acid used as starting material can be prepared, for example, by condensation of 4-carboxysalicyl-aldehyde with pyrazolyl - (1) - acetic acid in the presence of sodium acetate and glacial acetic acid; M.P. 297°.

(2) Application (a) A fabric made of fibres of polyethylene glycol terephthalate is introduced in a liquor ratio of 1:40 into a bath containing, per litre, 1.5 g. oleyl sulphonate, 0.75 g. formic acid, 0.1 g. 3-phenyl-7-[5-phenyl-2-methyl-1,2,4-triazolyl-(3)]-coumarin and 2 g. sodium chlorite; the bath is heated to boiling temperature within 30 minutes and kept at boiling temperature for about 45 minutes or in an autoclave at 120°. The fabric is subsequently rinsed and dried; it then shows a good brightening effect. Similar good brightening effects are achieved on filaments of polyvinyl chloride.

(b) A fabric made of fibres of aromatic polyesters is padded with an aqueous liquor containing, per litre, 1 g. each of a commercial dispersing and wetting agent, 4 g. of alginate thickening and 1 g. 3-phenyl-7-[5-phenyl-2-methyl-1,2,4-triazolyl-(3)]-coumarin. The fabric is then squeezed to a weight increase of 100%, dried and heated at 220° for 30 seconds. The fabric thus treated is subsequently washed hot and shows a clear brightening effect, compared with untreated material.

(c) A spinning solution prepared in the usual way from 1 kg. celulose acetate in 4 litres acetone is mixed with a solution of 1.5 g. 3-phenyl-7-[5-phenyl-2-methyl-1,2,4-triazolyl-(3)]-coumarin in acetone and spun in known manner. The filaments thus obtained show a good brightening effect which is fast to light.

(d) 65 g. polyvinyl chloride with a K-value of 72-74, 35 g. dioctyl phthalate, 2 g. of a commercial tin-containing organic stabilizer, 1 g. titanium dioxide (rutile) and 0.1 g. 3 - phenyl - 7-[5-phenyl-2-methyl-1,2,4-triazolyl-(3)]-coumarin are rolled on a hot roll with low friction at 165–170° for 5 minutes; the rough sheet so obtained is then drawn off on a four-roll calender to produce a foil of 300μ. The foil shows a very clear brightening effect.

(e) 1 g. 3 - phenyl - 7 - [5-phenyl-2-methyl-1,2,4-triazolyl-(3)]-coumarin is dissolved in 1000 g. of a colourless varnish of nitrocellulose or cellulose acetate. The varnish is then thinly spread on a colourless substrate. After drying, the varnish layer shows an excellent brightening effect.

(f) A mixture of 100 g. polyester granulate consisting of terephthalic acid-ethylene glycol polyester and 0.5 g. 3 - phenyl - 7 - [5 - phenyl - 2 - methyl-1,2,4-triazolyl-(3)]-coumarin is heated at 300° for 30 minutes and extruded in the usual manner to produce filaments. The material obtained in this way shows an excellent brightening effect.

(g) A mixture of 100 g. polypropylene and 0.5 g. 3-phenyl - 7 - [5 - phenyl - 2 - methyl-1,2,4-triazolyl-(3)]-coumarin is heated at 280-290° and the melt is extruded according to known processes to produce filaments which show a very good brightening effect.

Similar good brightening effects are achieved according to (a)–(g) with the other 7-triazolyl-coumarins described under (1).

We claim:
1. 7-triazolyl-coumarins of the formula

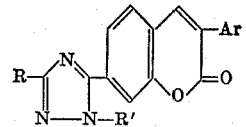

in which R is phenyl; naphthyl; pyridyl; phenyl or naphthyl substituted with $C_1$–$C_4$-alkyl, $C_1$–$C_4$-alkoxy, phenyl, p-chlorophenyl, o-chloro-phenyl, p-methylphenyl, halogen, or cyclohexyl; R' is hydrogen or $C_1$–$C_4$-alkyl; and Ar is phenyl; phenyl substituted with methyl, ethyl, methoxy, ethoxy, chlorine or bromine; or pyrazolyl-1.

2. A 7 - triazolyl-coumarin of claim 1 having the formula

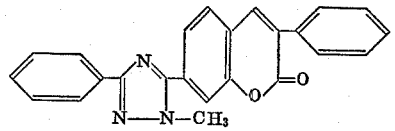

References Cited

FOREIGN PATENTS 1,551,662  11/1968  France ............ 260—308

OTHER REFERENCES

Elderfield, Heterocyclic Compounds, vol. 7 (New York, 1961), pp. 435–438.

ALTON D. ROLLINS, Primary Examiner

U.S. Cl. X.R.

8—1 W; 252—301.2 W; 260—295 F, 296 R, 308 A, 310 R, 343.2 R, 564 R